US008654286B2

(12) United States Patent
Hashimoto et al.

(10) Patent No.: US 8,654,286 B2
(45) Date of Patent: Feb. 18, 2014

(54) LIQUID CRYSTAL DISPLAY DEVICE AND DISPLAY DEVICE SUBSTRATE

(75) Inventors: Yoshito Hashimoto, Osaka (JP); Hiroyuki Ohgami, Osaka (JP); Masayuki Soga, Osaka (JP); Katsuhiro Kikuchi, Osaka (JP); Masakazu Shibasaki, Osaka (JP); Yuichi Iyama, Osaka (JP); Masumi Kubo, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 825 days.

(21) Appl. No.: 12/810,404

(22) PCT Filed: Sep. 10, 2008

(86) PCT No.: PCT/JP2008/066349
§ 371 (c)(1),
(2), (4) Date: Sep. 16, 2010

(87) PCT Pub. No.: WO2009/081629
PCT Pub. Date: Jul. 2, 2009

(65) Prior Publication Data
US 2011/0007252 A1    Jan. 13, 2011

(30) Foreign Application Priority Data
Dec. 25, 2007 (JP) ................................ 2007-332995

(51) Int. Cl.
*G02F 1/1335* (2006.01)
(52) U.S. Cl.
USPC ....................................................... 349/114
(58) Field of Classification Search
None
See application file for complete search history.

(56) References Cited

U.S. PATENT DOCUMENTS

2004/0105059 A1    6/2004  Ohyama
2006/0061714 A1*   3/2006  Tashiro et al. ................ 349/113
2006/0187387 A1    8/2006  Ohyama
2006/0187388 A1    8/2006  Ohyama
2007/0126960 A1*   6/2007  Joten ............................ 349/117
2009/0219472 A1    9/2009  Fujita

FOREIGN PATENT DOCUMENTS

| JP | 2003-322857 | 11/2003 |
|---|---|---|
| JP | 2006-154583 | 6/2006 |
| WO | 2007/063629 | 6/2007 |

OTHER PUBLICATIONS

International Search Report for PCT/JP2008/066349, mailed Oct. 14, 2008.

* cited by examiner

*Primary Examiner* — Tina Wong
(74) *Attorney, Agent, or Firm* — Nixon & Vanderhye, P.C.

(57) ABSTRACT

The present invention provides a liquid crystal display device which allows an improvement in contrast ratio by compensating retardation given in a liquid crystal layer, even if a retardation layer has an inclined portion, and a desired retardation is varied at the inclined portion. The present invention is a vertical alignment liquid crystal display device, including:

a pair of substrates facing each other;
a liquid crystal layer disposed between the pair of substrates;
a transmissive display region; and
a reflective display region,
wherein one of the pair of substrates includes a λ/4 retardation layer in the reflective display region, the λ/4 retardation layer protruding towards the liquid crystal layer,
the λ/4 retardation layer includes an inclined portion inclined to a flat face of the substrate, and
an azimuth of the inclined portion is substantially parallel to a slow axis azimuth of the λ/4 retardation layer.

7 Claims, 5 Drawing Sheets

LIQUID CRYSTAL DISPLAY DEVICE AND DISPLAY DEVICE SUBSTRATE

This application is the U.S. national phase of International Application No. PCT/JP2008/066349, filed 10 Sep. 2008, which designated the U.S. and claims priority to Japanese Patent Application No. 2007-332995, filed 25 Dec. 2007, the entire contents of each of which are hereby incorporated by reference.

TECHNICAL FIELD

The present invention relates to a liquid crystal display device and a display device substrate. More particularly, the present invention relates to a liquid crystal display device and a display device substrate each preferably used in mobile devices such as a cellular phone.

BACKGROUND ART

Liquid crystal display devices have been used in various fields because of its thin profile, lightweight, and low power consumption characteristics and the like, and are commonly used, in recent years, in mobile devices such as a cellular phone. Such LCD devices are often used in outdoor environments, and in such environments, prevention of reflection of ambient light and reduction in power consumption need to be achieved. Therefore transflective liquid crystal display devices in which both ambient light and a backlight can be used for display have been developed. The transflective LCD devices can provide display in both a transmissive mode and a reflective mode.

When transflective LCD devices are normally black vertical alignment (VA) LCD devices, a λ/4 retarder is arranged in a reflective display region of the LCD device for performing effective reflective display. The λ/4 retarder gives a retardation of λ/4 between two polarization components that oscillate in mutually-perpendicular two directions of transmissive light having a wavelength of A, whereby the transmissive light is converted into circularly polarized light. The λ/4 retarder is arranged in the reflective display region and polarizing plates are arranged in cross-Nicol. According to this configuration, the polarizing plate disposed on a viewing side can block light that has entered from a viewing side and then reflected from the reflective display. Thus normally black display can be provided.

However, when a λ/4 retarder is arranged in a transflective LCD device, a circularly polarizing plate including a linearly polarizing element and a λ/4 retarder is generally attached over the entire viewing-side surface of the liquid crystal display panel. In this case, the λ/4 retarder is arranged not only a reflective display region but also a transmissive display region. Therefore, unneeded retardation is given to transmissive light by the λ/4 retarder arranged in the transmissive display region, which might cause reduction in contrast ratio, luminance, and the like of transmissive display.

An approach for eliminating the unneeded retardation given to the transmissive light by the viewing face-side λ/4 retarder by arranging a λ/4 retarder also on a back side of the LCD device has been developed. However, in the approach, retardations given by the λ/4 retarders on the respective sides need to be accurately matched, and therefore the accuracy of the production process needs to be improved. This need leads to an increase in costs, and in this aspect, the approach needs to be improved. According to the approach, two λ/4 retarders are used, which leads to an increase in costs and thickness of the panel. Also in this aspect, the approach needs to be improved.

Patent Document 1 discloses, for example, a technology for forming a λ/4 retardation layer only in a reflective part of a liquid crystal display device. The LCD device in accordance with Patent Document 1 includes the λ/4 retardation layer in the reflective part but not in a transmissive part, and therefore light does not pass through the λ/4 retardation layer in the transmissive part. As a result, a reduction in contrast ratio in transmissive display can be prevented.

Further, Patent Document 2 discloses a liquid crystal display device including a multilayer structure where a first substrate having a reflective layer, a liquid crystal layer, a second substrate, and a polarizing plate are stacked in this order from a back face to a display face. According to this LCD device, the first substrate includes a retardation layer between the reflective layer and the liquid crystal layer or in a region free from the reflective layer, or the second substrate includes a retardation layer. This retardation layer has two or more regions giving different retardations in a display face plane. According to this, retardation can be compensated in accordance with the respective display modes.
[Patent Document 1]
  Japanese Kokai Publication No. 2003-322857
[Patent Document 2]
  WO 2007/063629

DISCLOSURE OF INVENTION

When the λ/4 retardation layer is arranged only in the reflective part as described in Patent Document 1, the λ/4 retardation layer is formed by forming a liquid crystal monomer film, and curing and patterning it. In such steps, an edge of the λ/4 retardation layer might be tapered to have a small thickness. The tapered region of the λ/4 retardation layer in the reflective part might not give λ/4 retardation only by itself. When the λ/4 retardation layer is used as the retardation layer in Patent Document 2, the tapered region of the λ/4 retardation layer might not give λ/4 retardation only by itself either. Further, according to Patent Documents 1 and 2, the relation between an azimuth of an inclined portion formed by the tapering and a slow axis azimuth of the λ/4 retardation layer is not considered at all. Therefore, light leakage around the tapered region occurs in a black display state, which might lead to a reduction in contrast ratio. In this aspect, these technologies need to be improved.

The present invention has been made in view of the above-mentioned state of the art. The present invention has an object to provide an LCD device and a display device substrate each allowing an improvement in contrast ratio by compensating retardation given by a portion having an inclination (inclined portion) of a retardation layer.

The present inventors made various investigations on improvement in contrast ratio of transflective vertical alignment liquid crystal display devices and noted a λ/4 retardation layer arranged in a reflective display region. The present inventors found the followings. When a λ/4 retardation layer is formed on a liquid crystal layer side of one of a pair of substrates having the LC layer therebetween and the λ/4 retardation layer is patterned so that only a portion in the reflective display region remains, the resulting λ/4 retardation layer has an inclined portion, which is inclined to a flat face of the substrate. A region where the inclined portion is formed cannot give a retardation of λ/4 to light entered into the LCD device. Therefore, light leakage might occur in a black display state, leading to a reduction in contrast ratio. The inventors found this problem can be solved in the following manner. When an azimuth of the inclined portion and a slow axis azimuth of the λ/4 retardation layer are substantially in parallel to each other, a slow axis azimuth of the inclined portion of the λ/4 retardation layer can be identical to a longitudinal axis azimuth (slow axis azimuth) of an LC molecule that is tilted in the vicinity of the inclined portion, and thereby the LC molecule compensates the retardation that can not be given due to the inclined portion. Thus, when no voltage is applied to the LC layer, light leakage, which might be occurred in a region (hereinafter, also referred to as an "inclination region") where the inclined portion is included, can be suppressed (luminance in a black display state can be lowered). As a result, contrast ratio can be improved. Thus, the above-mentioned problems have been admirably solved, leading to completion of the present invention.

That is, the present invention is a vertical alignment liquid crystal display device (hereinafter, also referred to as "first liquid crystal display device"), comprising:

a pair of substrates composed of a viewing-side substrate and a back-side substrate facing each other;

a liquid crystal layer disposed between the pair of substrates;

a transmissive display region; and a reflective display region, wherein one of the pair of substrates includes a λ/4 retardation layer in the reflective display region, the λ/4 retardation layer protruding towards the liquid crystal layer, the λ/4 retardation layer includes an inclined portion inclined to a flat face of the substrate, and an azimuth of the inclined portion is substantially parallel to a slow axis azimuth of the λ/4 retardation layer.

The present invention is described below in more detail.

The first LCD device of the present invention is a vertical alignment LCD device in which a pair of substrates facing each other, a liquid crystal layer disposed between the pair of substrates, a transmissive display region, and a reflective display region are included. That is, the first LCD device of the present invention is a transflective LCD device having a transmissive display region and a reflective display region. The transflective LCD device has a feature of a transmissive LCD device in which high visibility is provided in dark environments by using a light source such as a backlight, and a feature of a reflective LCD device in which low power consumption is achieved by using ambient light. The transflective LCD device is also referred to as a reflective-transmissive LCD device. The reflective display region is a region where display is provided using light incident from a viewing-side substrate in the following manner. The incident light passes through a liquid crystal layer, then is reflected from a reflective layer provided in a back-side substrate, then again passes through the LC layer, and then goes out from the viewing-side substrate. When reflection is performed by the reflective layer provided in the back-side substrate, the reflective display region is preferably provided with the reflective layer. The transmissive display region is a region in which display is performed using light incident from the back-side substrate in the following manner. The incident light passes through the LC layer and goes out from the viewing-side substrate. The transmissive display region is preferably a region other than the reflective display region and provided with a pixel electrode including a transparent conductive film for transmissive display. Examples of the pair of substrates facing each other preferably include, but not particularly limited to, a transparent substrate, such as a glass substrate, a quartz substrate, and a plastic substrate. In order to reduce costs, a glass substrate and a plastic substrate are more preferred.

The VA LCD device includes the LC layer constituted by liquid crystal molecules with negative dielectric anisotropy, and the pair of substrates each including a vertical alignment film on the LC layer-side surface. In such a configuration, the LC molecules can be aligned so that a longitudinal axis of each LC molecule is vertical to a flat surface (surface of vertical alignment film) of the substrate, for example, when no voltage or a voltage lower than a threshold voltage is applied to the LC layer. When a threshold voltage or higher is applied to the LC layer, a polarization state of light entered the LC layer can be controlled by tilting the LC molecules. Further, the polarization state of the incident light is controlled, and so an amount of transmissive light can be controlled by a polarizing element the LCD device includes.

The first LCD device includes the pair of substrates each including the polarizing element. The two polarizing elements are preferably arranged in cross-Nicol when the first LCD device is viewed in plan. The thus-arranged two polarizing elements allow normally black display (display where black display is provided when a threshold voltage or lower is applied to the LC layer) in the transmissive display region. Generally, contrast ratio can be more improved in normally black display than in normally white display (display where white display is provided when a threshold voltage or lower is applied to the LC layer).

One of the pair of substrates includes a λ/4 retardation layer in the reflective display region. The λ/4 retardation layer protrudes towards the liquid crystal layer. The λ/4 retardation layer is one giving a retardation of one-quarter wavelength (95 to 195 nm) to visible light (light having a wavelength ranging from 380 to 780 nm) entered thereinto. In the present invention, the λ/4 retardation layer is preferably one giving a retardation of 137.5 nm to visible light having a wavelength of 550 nm, which is well visually perceived of visible light wavelength. When the LCD device includes color filters of a plurality of colors, it is preferred that a retardation value of the λ/4 retardation layer is set in accordance with a color of the color filter arranged corresponding to the λ/4 retardation layer. For example, when red, green, and blue color filters are used, the retardation value of the λ/4 retardation layer arranged corresponding to the red color filter is preferably set to 162.5 nm, which is one-fourth of 650 nm, the retardation value of the λ/4 retardation layer arranged corresponding to the green color filter is preferably set to 137.5 nm, which is one-fourth of 550 nm, and the retardation value of the λ/4 retardation layer arranged corresponding to the blue color filter is preferably set to 112.5 nm, which is one-fourth of 450 nm. By arranging the λ/4 retardation layer so that a slow axis thereof makes an angle of 45° with a transmission axis of the polarizing element provided in a viewing-side substrate when the first LCD device is viewed in plan, the λ/4 retardation layer can convert linearly polarized light passed through the polarizing element into circularly polarized light. For example, when black display is performed (when the LC molecules in the LC layer are vertically aligned), in the reflective display region, incident light is reflected on the back side of the first LCD device and back to the viewing side to be used for display. When passing through the λ/4 retardation layer again, the reflected light is converted from circularly polarized light into linearly polarized light. As mentioned above, when the λ/4 retardation layer is arranged in the reflective display region and the LC molecules in the LC layer are vertically aligned, light passes through the λ/4 retardation layer twice when entering and going out from the LCD device. As a result, the LCD device can provide black display in normally black mode.

The λ/4 retardation layer includes an inclined portion inclined to a flat face of the substrate, and an azimuth (an azimuth parallel to a straight line of shortest distance between the highest point and the lowest point of the inclined portion) of the inclined portion is substantially parallel to a slow axis azimuth of the λ/4 retardation layer. The azimuth of the inclined portion of the λ/4 retardation layer is preferably any one azimuth or two azimuths opposing each other (azimuths that are rotated 180° to each other, for example, two azimuths opposing each other shown by the white arrows in FIG. 1(b)) In the present description, the term "azimuth" is intended to refer to direction on a two-dimensional face parallel to a flat face of the substrate, and the term "direction" is intended to refer to direction in a three-dimensional space defined by a combination of the azimuth and an angle to the flat face of the substrate. For example, the azimuth of the inclined portion is an azimuth having a direction from a high portion to a low portion of the inclined portion and parallel to the flat face of the substrate. In the present invention, the term "substantially parallel to" is not especially limited to a state "completely parallel to" and includes a state providing the same operation and advantages as the state "completely parallel to" does. For example, it is sufficient that the angle made by the azimuth of the inclined portion of the λ/4 retardation layer and the slow axis azimuth thereof is 5° or less.

As mentioned above, the λ/4 retardation layer has the inclined portion on its LC layer-side surface, the inclined portion being inclined to the flat face of the substrate. Therefore, when a voltage lower than a threshold voltage is applied for driving the first LCD device, the LC molecules in an inclination region including the inclined portion are aligned in a direction vertical to the inclined surface of the inclined portion. According to this, the azimuth of the inclined portion and the slow axis azimuth of the λ/4 retardation layer are substantially parallel to each other, and therefore retardation of light having passed through the inclination region of the λ/4 retardation layer can be compensated by retardation given by the LC molecules in the inclination region when no voltage or a voltage lower than a threshold voltage is applied to the LC layer. That is, when the longitudinal axis azimuth of the LC molecules in the vicinity of the inclined portion in the LC layer and the slow axis azimuth of the retardation layer are substantially parallel to each other, a difference in retardation in a region in which the λ/4 retardation layer is arranged can be compensated. According to this, light leakage in a black display state (for example, when a voltage not larger than a threshold voltage is applied to the LC layer) can be prevented, which results in an improvement in contrast ratio. In addition, it is preferred that an inclination angle (an angle made by the flat face of the substrate and the inclined surface of the inclined portion) of the inclined portion of the λ/4 retardation layer is adjusted depending on patterning conditions. According to this, the inclination angle can be adjusted depending on a refractive index of the LC molecules used for the LC layer, a configuration of the LCD device, and the like. Therefore, contrast ratio can be further improved. It is sufficient that the inclined portion is inclined to the flat face of the substrate. For example, the inclined surface of the inclined portion may make a specific constant angle or various angles with the flat face of the substrate.

The production process can be simplified when the λ/4 retardation layer is arranged on the LC layer side of one of the pair of substrates (a back-side substrate or a viewing-side substrate) because such a λ/4 retardation layer is formed together with the formation process of a structure (for example, a color filter, a TFT element, and the like) formed in the same substrate. If the λ/4 retardation layer is arranged also in the transmissive display region between the pair of substrates, luminance is increased in a black display state in the transmissive display due to retardation given to light incident from the back-side substrate, which results in a reduction in contrast ratio. However, when arranged on the LC layer side of one of the pair of substrates, the λ/4 retardation layer can be arranged easily and correctly only in the reflective display region. As a result, contrast ratio, luminance, chromaticity, and the like, which are related to display qualities, can be improved. When arranged in the viewing-side substrate including a color filter, the λ/4 retardation layer may be arranged on the back side of the color filter (on the color filter) or may be arranged between the color filter and the viewing-side substrate. For example, when arranged on a plurality of color filters different in colors, that is, when patterned after arranging the color filters of different colors, the λ/4 retardation layer might not be formed in a uniform thickness due to a variation in thickness among the color filters, a variation in wettability of a polymerizable resin to the color filters. In order to form the λ/4 retardation having a uniform thickness, a flattered surface is formed by forming an overcoat layer on the color filters. When formed between the color filter and the viewing-side substrate, the λ/4 retardation layer having a more uniform thickness can be formed on a flat substrate.

The λ/4 retardation layer preferably includes polymerizable liquid crystals (LCs having a polymerizable functional group), such as polymerizable nematic LCs. According to this, the λ/4 retardation layer can be simply formed. A polymer made from a mesogen material is used for the polymerizable LCs. The mesogen material is a mesogen group-containing compound (monomer) and the mesogen group has a thin and long rod shape or a planar shape, and has a rigid molecular chain. The mesogen group is represented by the formulae (1) to (3)

[Formula 1]

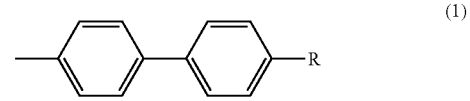

(1)

[Formula 2]

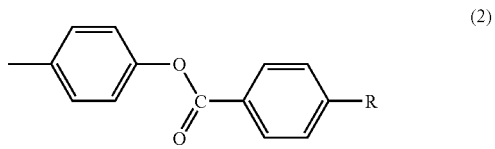

(2)

[Formula 3]

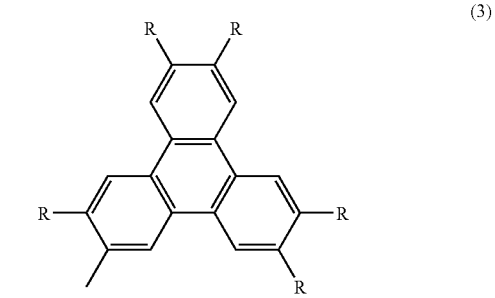

(3)

In the formulae (1) to (3), R is independently selected from the atomic group consisting of an alkyl group, an alkoxyl group, a cyano group, and a nitro group. Examples of the polymerizable functional group include one represented by the formulae (4) and (5).

[Formula 4]

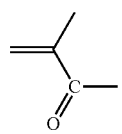
(4)

[Formula 5]

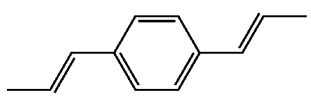
(5)

An acrylic bonding material (specifically, acrylates and methacrylates) including a polymerizable functional group represented by the formula (4) at a terminal of the compound represented by the formula (1) or (2) is preferably used for the polymerizable LCs constituting the λ/4 retardation layer.

The λ/4 retardation layer may be formed by a method including the following steps for example: coating polymerizable LCs; polymerizing and curing the LCs while controlling alignment by ultraviolet irradiation and the like; and patterning the cured LCs by photolithography and the like.

When a longitudinal axis azimuth of the polymerizable LCs constituting the λ/4 retardation layer and the azimuth of the inclined portion of the λ/4 retardation layer are parallel to each other, the slow axis azimuth of the λ/4 retardation layer and the azimuth of the inclined portion can be parallel to each other. According to this, the longitudinal axis azimuth of the LC molecules in the LC layer in the inclination region becomes parallel to the longitudinal axis azimuth of the polymerizable LCs in the λ/4 retardation layer. Therefore, a retardation value given by the inclined portion of the λ/4 retardation layer can be compensated by the LC molecules in the LC layer in the inclination region.

It is preferred that the first LCD device includes a retardation control alignment film on the λ/4 retardation layer (on the side opposite to the LC layer side of the λ/4 retardation layer). By use of the retardation control alignment film, retardation generated when light passes through the retardation layer can be controlled. Therefore, the λ/4 retardation layer can be simply formed. The retardation control alignment film may be rubbed in an uniform direction and constituted by the same material regardless of regions of the λ/4 retardation layer, but not limited thereto, and may be rubbed in different directions and constituted by different materials, depending on the regions of the λ/4 retardation layer. In the present description, the retardation control alignment film is formed to control alignment of polymerizable LCs constituting the retardation layer such as the λ/4 retardation layer, and it is formed separately from a film (alignment film) for controlling alignment of LC molecules constituting the LC layer. The retardation control alignment film may be formed of the same material as the alignment film for the LC molecules constituting the LC layer, and may be formed of a polyimide resin and the like. The retardation control alignment film may be formed by, for example, a method including the steps of: coating a resin composition containing a material for the retardation control alignment film dissolved therein; drying the coated resin composition; and rubbing the dried resin composition with a metal roller. The polymerizable LCs constituting the retardation layer may be aligned by a method other than a rubbing treatment, and for example, may be aligned and controlled by photoirradiation.

In order to perform reflection display by use of light incident from the viewing-side substrate, the back-side substrate of the pair of substrates preferably includes a reflective layer in the reflective display region. The reflective layer preferably may be formed of a material with high reflectance, such as aluminum and silver material, but not particularly limited thereto. The reflective layer preferably has recesses and protrusions for reflecting and scattering light entering the reflective layer. It is more preferred that the reflective layer serves as a reflective electrode used for applying a voltage to the LC layer. When the λ/4 retardation layer is arranged on the back-side substrate, the reflective layer is provided between the back-side substrate and the λ/4 retardation layer.

The first LCD device may include a λ/2 retardation layer between the pair of substrates. When the λ/2 retardation layer is disposed between the pair of substrates in the reflective display region, the λ/2 retardation layer is preferably arranged on the side opposite to the LC layer side of the λ/4 retardation layer and more preferably disposed between the λ/4 retardation layer and a viewing-side polarizing element. The λ/2 retardation layer gives a retardation of λ/2 to light having passed therethrough. A slow axis of the λ/2 retardation layer makes an angle of 60° with the slow axis of the λ/4 retardation layer. The first LCD device may include a retardation layer for improving a viewing angle and is not particularly limited thereto. Negative biaxial retardation layer may be used as the retardation layer for improving a viewing angle.

The first LCD device of the present invention may or may not include other components as long as the first LCD device essentially includes a configuration in which one of the pair of substrates includes a λ/4 retardation layer in the reflective display region, the λ/4 retardation layer protruding towards the liquid crystal layer, the λ/4 retardation layer includes an inclined portion inclined to a flat face of the substrate, and an azimuth of the inclined portion is substantially parallel to a slow axis azimuth of the λ/4 retardation layer. However, the configuration of the first LCD device is not particularly limited thereto. For example, the first LCD device preferably includes a backlight for performing display in the transmissive display region, and includes electrodes used for applying a voltage to the LC layer. Examples of the electrodes include a common electrode formed over an entire surface of one of the pair of substrates and a pixel electrode formed for every pixel, which is a constituent of a display image. As mentioned above, the first LCD device has a configuration in which one of the pair of substrates includes the λ/4 retardation layer in the reflective display region, the λ/4 retardation layer protruding towards the LC layer side, the λ/4 retardation layer includes an inclined portion inclined to a flat face of the substrate, and an azimuth of the inclined portion is parallel to a slow axis azimuth of the λ/4 retardation layer. Even if the LCD device has such a configuration, light leakage in a black display state canbe suppressed and contrast ratio can be improved. For example, when the retardation layer is formed on the corresponding reflective display region of each of the pair of substrates and the total retardation due to the two retardation layers is set to λ/4, the effect of the present invention can be provided. In this case, this pair of the two retardation layers is referred to as the λ/4 retardation layer.

Preferred embodiments of the first LCD device of the present invention are described below in more detail.

It is preferred that the λ/4 retardation layer has a thickness of about one-half a thickness of the liquid crystal layer in the transmissive display region. The thickness of the inclined portion of the λ/4 retardation layer is varied stepwise, and therefore it is preferred that a maximum thickness of the λ/4 retardation layer is about one-half the thickness of the LC layer in the transmissive display region. When the λ/4 retardation layer has a liquid crystal layer-side surface including the inclined portion and the flat portion, the inclined portion having an inclined surface inclined to the flat face of the substrate, the flat portion having a surface parallel to the flat face of the substrate, the flat portion preferably has a thickness of about one-half the thickness of the LC layer in the transmissive display region. According to this, the first LCD device including a multi-gap structure can be provided by use of the λ/4 retardation layer. The LC layer in the reflective display region has a thickness of about one-half the thickness of the LC layer in the transmissive display region because the λ/4 retardation layer has a thickness of about one-half the thickness of the LC layer in the transmissive display region. Further, retardation between light having passed through the LC layer in the reflective display region and light having passed through the LC layer in the transmissive display region is eliminated. As a result, in any environments, such as bright and dark environments, transmittance and/or reflectance, and contrast ratio and the like can be improved and inversion phenomenon and the like can be suppressed. The λ/4 retardation layer also serves as a member for the multi-gap structure, and therefore such a member does not need to be additionally arranged. As a result, the number of production steps can be reduced. The thickness of the λ/4 retardation layer is determined by the thickness of the LC layer and the like. In order to simplify a production process, the thickness of the λ/4 retardation layer is preferably 0.5 to 3.0 μm, and more preferably 1.0 to 2.0 μm. When other members are provided in the reflective display region in addition to the λ/4 retardation layer, it is preferred that the LC layer in the reflective display region has a thickness of about one-half the thickness of the LC layer in the transmissive display region. For example, when the thickness of the LC layer in the reflective display region does not adjusted by only the λ/4 retardation layer to about one-half the thickness of the LC layer in the transmissive display region, in order to adjust the thickness of the LC layer, the thickness of the color filter layer may be adjusted or an additional member, such as a member of transparent resin, may be arranged. In the present invention, the phrase "about one-half" may be used not only when the λ/4 retardation layer has a thickness of exactly one-half the thickness of the LC layer in the transmissive display region but also when the λ/4 retardation layer has such a thickness that the same operation and effects as the retardation layer having exactly one-half the thickness of the LC layer are obtained. The λ/4 retardation layer may have a margin of plus or minus 10% of the thickness of one-half the thickness of the LC layer in the transmissive display region.

It is preferred that the first liquid crystal display device comprises a plurality of pixels, wherein the λ/4 retardation layer is arranged in a band shape and overlaps with the plurality of pixels, when viewed in plan. Each pixel is a minimum unit of a display image and when performing color display using three colors such as red, green, and blue colors, the pixel shows each color. If the λ/4 retardation layer is patterned for each pixel, inclined portions having an azimuth not parallel to the slow axis azimuth of the λ/4 retardation layer might be formed. Further, if such inclined portions having the azimuth not parallel to the slow axis azimuth of the λ/4 retardation layer is positioned in the reflective display region, light leakage and the like might be caused and contrast ratio might be reduced in the region. Therefore, for example, as shown in FIG. 1(a), when pixels (in FIG. 1(a), each pixel is defined by a transmissive pixel electrode 124) each having a rectangular shape are arranged (in an array), it is preferred that the λ/4 retardation layer 111 is arranged in a band shape and overlaps with the pixels, when viewed in plan. According to this, two inclined portions 11b are formed along two longitudinal sides of the λ/4 retardation layer 111. Further azimuths of the two inclined portions 11b are opposing each other. Further all the azimuths of the inclined portions lib can be substantially parallel to the slow axis azimuth of the λ/4 retardation layer. As a result, light leakage through the inclined portions and the like can be prevented and contrast ratio can be further improved. According to FIG. 1(a), the λ/4 retardation layer has the two inclined portions 11b formed along the respective two longitudinal sides of the λ/4 retardation layer in a band shape, but not limited thereto, and may have one inclined portion formed along one longitudinal side thereof.

It is preferred that the λ/4 retardation layer is disposed in the viewing-side substrate. According to this, display qualities can be further improved. A reflective layer for reflecting light disposed on a back-side substrate may have recesses and protrusions on its surface in order to uniformly scatter light incident from a viewing side. When the λ/4 retardation layer is formed on the reflective layer (on the LC layer side) having recesses and protrusions and disposed on the back-side substrate, recesses and protrusions are formed also in the λ/4 retardation layer. As a result, retardation given to light having passed through the λ/4 retardation layer might be varied. When the λ/4 retardation layer is in the viewing-side substrate, the λ/4 retardation layer can be formed on a relatively flat surface. As a result, retardation changes and a decrease in contrast ratio can be suppressed. Light incident from the viewing side is slightly reflected from a transparent electrode and the like as well as the reflective layer, such as a layer including aluminum. In order to prevent light reflected from a member other than the reflective layer from leaking in a black display state, the λ/4 retardation layer is preferably provided in the viewing-side substrate. When the λ/4 retardation layer is provided in the back-side substrate, the reflective layer, the λ/4 retardation layer, and the transparent electrode are arranged, for example, in this order from the back side, whereby light reflected from the transparent electrode does not pass through the λ/4 retardation layer. As a result, when black display is performed, light reflected from the transparent electrode leaks through a viewing-side polarizing element, which might cause a decrease in contrast ratio. When the λ/4 retardation layer is provided in the viewing-side substrate, the λ/4 retardation layer and the transparent electrode are arranged in this order from the viewing side. Therefore, light incident from the viewing side passes through the λ/4 retardation layer and then is reflected by the transparent electrode. As a result, light reflected from the transparent electrode is blocked by the viewing-side polarizing element, leading to an improvement in contrast ratio.

The present invention is also a vertical alignment liquid crystal display device (hereinafter, also referred to as "second liquid crystal display device"), comprising:

a pair of substrates facing each other;

a liquid crystal layer disposed between the pair of substrates;

a transmissive display region; and a reflective display region, wherein one of the pair of substrates includes a λ/4 retardation layer in the reflective display region, the λ/4 retardation layer protruding towards the liquid crystal layer, the λ/4 retardation layer includes an inclined portion inclined to a flat face of the substrate, and during no voltage application to the liquid crystal layer, a tilt azimuth of liquid crystal molecules in the liquid crystal layer in a region including the inclined portion is substantially parallel to a slow axis azimuth of the λ/4 retardation layer. According to the second LCD device, light leakage that occurs when no voltage or a voltage lower than a threshold voltage is applied to the LC layer can be prevented, and therefore contrast ratio is improved. As a result, the second LCD device provides the same advantages as the first LCD device does.

The second LCD device of the present invention may or may not include other components as long as the second LCD device essentially includes a configuration in which one of the pair of substrates includes a λ/4 retardation layer in the reflective display region, the λ/4 retardation layer protruding towards the liquid crystal layer, the λ/4 retardation layer includes an inclined portion inclined to a flat face of the substrate, and during no voltage application to the liquid crystal layer, a tilt azimuth of liquid crystal molecules in the liquid crystal layer in a region including the inclined portion is substantially parallel to a slow axis azimuth of the λ/4 retardation layer. The configuration of the second LCD device is not particularly limited thereto.

Preferred embodiments of the second LC display device of the present invention are described below in more detail.

It is preferred that the λ/4 retardation layer has a thickness of about one-half the thickness of the LC layer in the transmissive display region.

It is preferred that the second LC display device includes a plurality of pixels and the λ/4 retardation layer is arranged in a band shape and overlaps with the pixels, when viewed in plan.

The λ/4 retardation layer is preferably provided in a viewing-side substrate.

According to these configurations, the same advantages as in the first LCD device can be obtained. The second LCD device may include other components, such as electrodes for applying a voltage to the LC layer, like the first LCD device, and the configuration of the second LCD device is not particularly limited.

The present invention is also a display device substrate, comprising:

a substrate; and a retardation layer on the substrate, wherein the retardation layer includes an inclined portion inclined to a flat face of the substrate, and an azimuth of the inclined portion is substantially parallel to a slow axis azimuth of the retardation layer. The retardation layer may have two slow axis azimuths opposing each other in a substrate plane surface. Examples of the retardation layer include a λ/4 retardation layer and a λ/2 retardation layer. The display device substrate may have other retardation layers. The advantages are obtained by using: for example, a positive A plate, including, but not limited to the λ/4 retardation layer; a positive biaxial retardation layer; or a negative biaxial retardation layer. Use of the negative biaxial retardation layer allows compensation of a viewing angle of a vertical alignment LCD device. Use of the positive biaxial retardation layer provides the same advantages as in the λ/4 retardation layer and the same advantages as by viewing angle compensation in vertical alignment LCD devices. According to this, in LCD devices including the display device substrate, light leakage and a reduction in reflectance possibly occurring in a black display state in the inclination region in the reflective region can be suppressed. As a result, contrast ratio can be improved. When the display device substrate is used in LCD devices, the display device substrate is preferably a color filter substrate or a TFT substrate, and more preferably a color filter substrate provided on a viewing side.

The present invention is also a liquid crystal display device (hereinafter, also referred to as "third liquid crystal display device"), comprising:

the display device substrate according to claim 6;

a counter substrate facing the display device substrate; and a liquid crystal layer disposed between the display device substrate and the counter substrate, wherein the retardation layer is included on a liquid crystal layer side of the display device substrate. According to the third LCD device, retardation of light having passed through an inclined portion of the retardation layer is compensated to a desired retardation by use of the display device substrate. Therefore, light leakage and a reduction in reflectance possibly occurring in a black display state in the inclination region in the reflective region, can be suppressed depending on a type of a retardation layer to be used. Further, a reduction in contrast ratio and coloring can be suppressed. The counter substrate is a substrate facing the display device substrate. For example, when the display device substrate is a color filter substrate, the counter substrate is preferably a TFT substrate. When the display device substrate is a TFT substrate, the counter substrate is preferably a color filter substrate. The third LCD device is not limited to a vertical alignment LCD device, and may be, for example, an IPS (in plane switching) LCD device. The advantages of the present invention are also exhibited in the IPS LCD device and the like. When reflection display is performed in the IPS LCD device, a λ/2 retardation layer is used as a retardation layer. In this case, retardation of light having passed through an inclined portion of the λ/2 retardation layer is compensated by LC molecules in the LC layer.

The third LCD device of the present invention may or may not include other components as long as the third LCD device essentially includes a configuration in which the display device substrate includes a substrate and a retardation layer on the substrate, and the retardation layer includes an inclined portion inclined to a flat face of the substrate, and an azimuth of the inclined portion is substantially parallel to a slow axis azimuth of the retardation layer, and further the third LCD device includes the display device substrate, a counter substrate facing the display device substrate; and a liquid crystal layer disposed between the display device substrate and the counter substrate, wherein the retardation layer is included on a liquid crystal layer side of the display device substrate. The configuration of the third LCD device is not particularly limited thereto.

Preferred embodiments of the third LCD device of the present invention are described below in more detail.

It is preferred that the retardation layer has a thickness of about one-half the thickness of the LC layer in the transmissive display region.

It is preferred that the third LCD device includes a plurality of pixels, and the retardation layer is arranged in a band shape and overlaps with the pixels, when viewed in plan.

The retardation layer is preferably provided in a viewing-side substrate.

According to the configuration, the same advantages as in the preferred embodiments of the first LCD device of the present invention can be obtained. The third LCD device may include other components, such as electrodes for applying a voltage to the LC layer, like the first LCD device, and the configuration of the third LCD device is not particularly limited.

EFFECT OF THE INVENTION

According to the LCD device of the present invention, light leakage which might occur when no voltage is applied to the LC layer can be suppressed and contrast ratio can be improved.

BEST MODES FOR CARRYING OUT THE INVENTION

The present invention is described in more detail below with reference to Embodiments using drawings, but not limited thereto.

Embodiment 1

FIG. 1 is a schematic view showing a configuration of a transflective and vertical alignment liquid crystal display device in accordance with Embodiment 1. FIG. 1(a) is a schematic plan view thereof. FIG. 1(b) is a schematic cross-sectional view thereof. FIG. 1(a) shows a positional relationship among a reflective electrode, a transmissive electrode, an aperture provided in a common electrode, and a λ/4 retardation layer. Other components are not shown. The two double-headed arrows in FIG. 1(a) show a slow axis azimuth of the λ/4 retardation layer and a transmission axis azimuth of a viewing-side polarizing plate. In FIG. 1(b), the double-headed arrow shows a slow axis azimuth of the λ/4 retardation layer and the white arrow shows an azimuth of an inclined portion of the λ/4 retardation layer.

As shown in FIG. 1(b), a liquid crystal display device 100 in accordance with Embodiment 1 has a configuration in which a back-side polarizing plate 123, a TFT substrate 102, a liquid crystal layer 130, a color filter substrate 101, and a viewing-side polarizing plate 113 are arranged in this order. The LC layer 130 is constituted by liquid crystal molecules 131 and 132 both having negative dielectric anisotropy. MLC-2068 (product of Merck Ltd.) with a refractive index anisotropy of 0.08 was used as a liquid crystal material constituting the LC layer 130. In the present Embodiment, the LC material containing a chiral material is used, but a LC material containing no chiral material may be used depending on a pixel structure.

First, the configuration of the color filter substrate 101 is described.

As shown in FIG. 1(b), red, green, and blue colored layers (not shown) are arranged on the LC layer 130 side of a viewing-side substrate 110. A retardation control alignment film (not shown) and a λ/4 retardation layer 111 composed of polymerizable liquid crystals are arranged in this order on the colored layers in a reflective display region 150. A common electrode 114 is arranged over an entire surface of the viewing-side substrate 110. A center portion of the common electrode 114 in the reflective display region 150 is provided with an aperture 115a and a center portion of the common electrode 114 in the transmissive display region 160 is provided with an aperture 115b. According to such a configuration, when a threshold voltage or higher is applied to the LC layer 130, the LC molecules 131 in the reflective display region 150 and the LC molecules 132 in the transmissive display region 160 can be separately aligned in radial alignment. The radial alignment means an alignment state of LC molecules which are radially arranged so that a longitudinal axis of each LC molecule is oriented outwards from a singularity as a central point when viewed from a direction normal to the substrate and the LC molecules are tilted towards the substrate surface when an LCD panel is viewed in cross section. Photo-polymerizable LCs are used as the polymerizable LCs constituting the λ/4 retardation layer 111. A vertical alignment film 112 is arranged over an entire surface of the common electrode 114. The viewing-side polarizing plate 113 is provided on the side opposite to the LC layer 130 side of the viewing-side substrate 110.

In FIG. 1(a), the part shaded by oblique lines shows a flat portion 11a of the λ/4 retardation layer 111 in a flat region 180, and the part shaded by horizontal lines shows an inclined portion 11b, which is inclined to the flat face of the viewing-side substrate 110, of the λ/4 retardation layer 111 in an inclination region 170. In this case, a vertical azimuth (azimuth of a vertical line of the inclined surface when the substrate is viewed in plan) of the inclined surface of the inclined portion 11b and the slow axis azimuth of the λ/4 retardation layer 111 are parallel to each other. The LC molecules 132 in the vicinity of the inclined portion 11b are aligned vertically to the inclined surface of the inclined portion 11b by the vertical alignment film 112 formed on the inclined portion 11b. Therefore, a longitudinal axis azimuth of the LC molecules 131 and the slow axis azimuth of the λ/4 retardation layer 111 are parallel to each other.

As shown in FIG. 1(a) the λ/4 retardation layer 111 is provided in the reflective display region 150 in a band shape and overlaps with a plurality of pixels each including a reflective electrode 121 and a transmissive pixel electrode 124. No layer 111 is provided in the transmissive display region 160. The width (the length in the transverse direction in FIGS. 1(a) and 1(b)) of the λ/4 retardation layer 111 is about 40 μm. The thickness (the thickness of the flat portion 11a) in the flat region 180 is about 1.5 μm. The width (the width of the flat region 180) of the flat portion 11a is about 30 μm. The width (the width of the inclination region 170) of the respective inclined portions 11b of the λ/4 retardation layer 111 is about 5 μm. The inclination angle of the inclined surface of the inclined portion 11b relative to the substrate plane surface is about 15°. In this case, the slow axis azimuth of the λ/4 retardation layer 111 is parallel to the azimuth of the inclined portion 11b. The viewing-side polarizing plate 113 is arranged so that an angle made by the transmission axis azimuth thereof and the slow axis azimuth of the λ/4 retardation layer 111 is 45°. The back-side polarizing plate 123 is arranged so that the transmission axis azimuth thereof is perpendicular to the transmission axis azimuth of the viewing-side polarizing plate 113.

FIG. 2 is a plan view schematically showing a relationship among a tilt azimuth of the LC molecules 132, the slow axis azimuth of the λ/4 retardation layer 111, and the transmission axis azimuth of the viewing-side polarizing plate 113, in the LCD device in accordance with Embodiment 1.

As shown in FIG. 2, the longitudinal axis azimuth of the LC molecules 132, which are aligned vertically to the inclined surface of the inclined portion 11b as shown in FIG. 1(b), is substantially parallel to the slow axis azimuth of the λ/4 retardation layer 111 shown by the arrow 1. The transmission axis azimuth of the viewing-side polarizing plate 113 shown by the arrow 3 makes an angle of 45° with the slow axis azimuth of the λ/4 retardation layer 111 shown by arrow 1. Such LC molecules 132 whose tilt azimuth is controlled can give retardation to light incident from the viewing side. Therefore, retardation given by the inclined portion 11b of the λ/4 retardation layer 111 in the inclination region 170 is compensated by the LC molecules 132 in a black state. As a result, contrast ratio can be improved.

The colored layer (not shown) may be formed of a photosensitive resin or the like containing a pigment such as red, green, and blue pigment. Colors for the colored layer include, but not limited thereto, three colors of cyan, magenta, and yellow. Four colors may be used for the colored layer. A transparent conductive material including indium tin oxide (ITO) may be used for the common electrode 114, but not limited thereto. The viewing-side substrate 110 may be formed of a transparent substrate, such as a glass substrate, a quartz substrate, and a plastic plate. In view of cost efficiency, a glass substrate and a plastic plate are preferred. The LC layer 130 in the flat region 180 in the reflective display region 150 has a thickness of 1.5 µm and the LC layer 130 in the transmissive display region 160 has a thickness of 3.0 µm.

A method for forming the λ/4 retardation layer 111 is described.

A retardation control alignment film for aligning polymerizable LCs, which constitutes the λ/4 retardation layer 111, in a specific direction is formed on colored layers. First, a polyimide film is formed on the colored layers by coating a resin composition containing a polyimide resin dissolved therein and drying the resin composition. Then, the polyimide film is rubbed in a specific direction with a metal roller wrapped by rayon, thereby forming the retardation control alignment film. Next, a polymerized and cured liquid crystal polymer film is formed by coating polymerizable LC monomers dissolved in a solvent to have a thickness of about 1.5 µm by spin coating and the like, and polymerizing the monomers by UV irradiation and the like. Thus, as shown in FIGS. 1(a) and 1(b), a slow axis at an azimuth from a reflective display region 150 to a transmissive display region 160 can be provided for the λ/4 retardation layer 111. In this case, a longitudinal axis azimuth of the polymerizable LCs is parallel to the slow axis azimuth of the λ/4 retardation layer 111. Then, a resist is coated on the LC polymer film and patterned. The LC polymer film and the retardation control alignment film are etched and patterned using the resist as a mask. Thus, the λ/4 retardation layer 111 having a flat portion 11a and an inclined portion 11b is formed. As mentioned above, the inclined portion 11b has a width of about 5 µm, and the flat portion 11a has a width of about 30 µm. The inclined surface of the inclined portion 11b makes an angle of 15° with the substrate plane surface. Polymerizable nematic LCs represented by the formulae (6) and (7) may be used, for example, as the polymerizable LC monomers.

in the reflective display region 150 and the transmissive display region 160 can be the same. There is no need to adjust the thickness of the LC layer 130 in the reflective display region 150 only with the λ/4 retardation layer 111. The LC layer 130 thickness may be adjusted, for example, by arranging a transparent resin in the reflective display region 150 and thereon arranging the λ/4 retardation layer 111.

The configuration of the TFT substrate 102 is described below.

A TFT element (not shown) is provided on the LC layer 130 side of a back-side substrate 120. The TFT element is provided at each intersection of gate lines (not shown) arranged parallel to each other and source lines (not shown) arranged parallel to each other, (the gate and source lines being arranged perpendicular to each other). A drain electrode of the TFT element is connected to a transmissive pixel electrode 124 that is provided over the transmissive display region 160 and the reflective display region 150. The reflective electrode 121 is provided on the transmissive pixel electrode 122 in the reflective display region 150. A vertical alignment film 122 is arranged over the entire surface of the reflective electrode 121 in the reflective display region 150 and the transmissive pixel electrode 124 in the transmissive display region 160. A back-side polarizing plate 123 is provided on the side opposite to the LC layer 130 side of the back-side substrate 120.

Transparent conductive materials such as indium tin oxide (ITO) may be used for the transmissive pixel electrode 124. The reflective electrode 121 may be formed of a material having relatively high reflection efficiency, such as aluminum. The surface of the reflective electrode 121 preferably has recesses and protrusions, but may be flat. A transparent substrate, such as a glass substrate, a quartz substrate, and a plastic plate, may be used for the back-side substrate 120 including the reflective electrode 121 and the like.

A film prepared by adsorbing iodine to a polyvinyl alcohol (PVA) film and being stretched may be used as polarizing elements included in the back-side polarizing plate 123 and the viewing-side polarizing plate 113.

The LCD device of Embodiment 1 is an active matrix LCD device in which display is performed using the TFT elements,

[Formula 6]

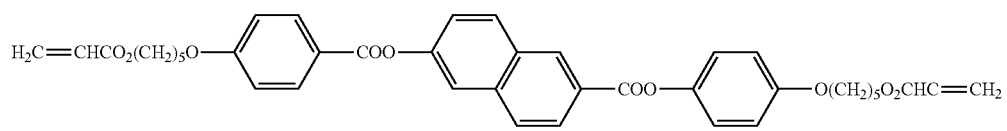

(6)

[Formula 7]

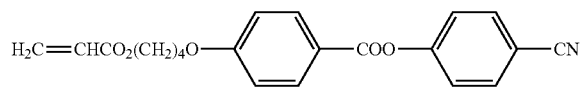

(7)

The λ/4 retardation layer 111 is arranged in a region (the reflective display region 150) facing a reflective electrode 121 in a TFT substrate 102. In Embodiment 1, the λ/4 retardation layer 111 has a thickness of about 1.5 µm and an LC layer 130 in the transmissive display region 160 has a thickness of about 3.0 µm. Therefore, the LC layer 130 in the reflective display region 150 has a thickness of about one-half the thickness of the LC layer 130 in the transmissive display region 160. In such an LC layer 130, optical path lengths of the LC layer 130 but the LCD device of the present invention may be, for example, a passive matrix LCD device.

FIG. 7 is a plan view schematically showing alignment configurations of LC molecules in the reflective display region 150 and the transmissive display region 160 of the LCD device in accordance with Embodiment 1.

According to a configuration of the LCD device of Embodiment 1, apertures 115a and 115b are provided in a common electrode 114 as shown in FIG. 7. When a threshold voltage or higher is applied to the LC layer 130, LC molecules 133 in the reflective display region 150 are radially aligned due to the aperture 115a and LC molecules 133 in the transmissive display region 160 are also radially aligned due to the aperture 115b. In this case, the LC molecules 133 are aligned radially with respect to each of the apertures 115a and 115b as a central point when a threshold voltage or higher is applied to the LC layer 130. In contrast to this, when no voltage is applied to the LC layer, the LC molecules 133 are aligned vertically to the vertical alignment film 112. Therefore the LC molecules in the inclination region 170 are aligned parallel to the azimuth of the inclined portion 11b of the λ/4 retardation layer 111.

In the LCD device of Embodiment 1, the common electrode 114 is provided with the apertures 115a and 115b, but the LCD device of the present invention is not limited thereto and the common electrode 114 may or may not be provided with an aperture. The alignment of the LC molecules when a threshold voltage or more is applied to the LC layer 130 can be also controlled by a structure (what is called a rib, a rivet, or the like) on the LC layer side of the common electrode 114 instead of by the aperture.

In the LCD device of Embodiment 1, the alignment configuration of the LC molecules in the reflective display region 150 and the transmissive display region 160 are controlled as shown in FIG. 7, but the LCD device of the present invention is not limited to such a configuration. LC molecules in a reflective display region and a transmissive display region may be aligned as shown in FIGS. 8(a) to 8(d) and FIG. 9.

FIGS. 8(a) to 8(d) and FIG. 9 are plan views schematically showing the alignment configurations of the LC molecules in the reflective display region and the transmissive display region in accordance with modified examples. FIG. 8(a) shows LC molecules 302 in a reflective display region 352 and a transmissive display region 362. The molecules 302 in the region 352 are radially aligned due a circular aperture 316a formed in the center portion of a common electrode 414a. The molecules 302 in the region 362 are aligned in up and down directions (alignment division) due to a linear aperture 316b formed in the common electrode 414a. The aperture 316b extends (transversely) across the transmissive display region from the reflective display region side. The circular aperture 316a may be a circular structure provided in the common electrode 414a and the linear aperture 316b may be a linear structure provided in the common electrode 414a. FIG. 8(b) shows LC molecules 303 in a reflective display region 353 and a transmissive display region 363. The molecules 303 in the region 353 are radially aligned due to a circular aperture 317a formed in the center portion of a common electrode 414b. The molecules 303 in the region 363 are aligned in right and left orientations (alignment division) due to a linear aperture 317b formed in the common electrode 414b. The circular aperture 317a may be a circular structure provided in the common electrode 414b and the linear aperture 317b may be a linear structure provided in the common electrode 414b. FIG. 8(c) shows LC molecules 304 in a reflective display region 354 and a transmissive display region 364. The molecules 304 in both the regions 354 and 364 are aligned in up and down orientations (alignment division) due to a linear aperture 318 formed in a common electrode 414c. The aperture 318 extends (transversely) across the transmissive display region from the reflective display region side. The linear aperture 318 may be a linear structure provided in the common electrode 414c.

FIG. 8(d) shows LC molecules 305 in a reflective display region 355 and a transmissive display region 365. The molecules 305 in both the regions 355 and 365 are aligned in left and right orientations (alignment division) due to linear apertures 319a and 319b formed in a common electrode 414d. The linear apertures 319a and 319b may be a linear structure provided in the common electrode 414d. FIG. 9 shows LC molecules 306 in a reflective display region 356 and a transmissive display region 366. The molecules 306 in the region 356 are radially aligned due to a circular aperture 320 formed in the center portion of a common electrode 414e. The molecules 306 in the region 366 are aligned in four orientations (alignment division), right, left, up and down, due to the common electrode 414e formed as a linear and fine transparent electrode 314 extending four directions. The circular aperture 320 may be a circular structure provided in the common electrode 414e.

Although the inclined surface of the inclined portion 11b of the λ/4 retardation layer 111 is a plane surface as shown in FIG. 1(b) in Embodiment 1, the advantages of the present invention can be also obtained in the case where the inclined surface of the inclined portion 11a is curved (a semi-circular cross section) with varying an angle relative to the flat face of the substrate. The white arrow in FIG. 3 shows the azimuth of the inclined portion and the double-headed arrow shows the slow axis azimuth of the λ/4 retardation layer 111a.

An LCD device 100a shown in FIG. 3 has the same configuration as the LCD device shown in FIG. 1(b), except that the inclined surface of the inclined portion of the λ/4 retardation layer 111a is curved.

Specifically, the LCD device 100a shown in FIG. 3 has a configuration in which a back-side polarizing plate 123a, a TFT substrate 102a, an LC layer 130a, a color filter substrate 101a, and a viewing-side polarizing plate 113a are arranged in this order. The LC layer 130a is constituted by LC molecules 131a with negative dielectric anisotropy. Red, green, and blue colored layers (not shown) are arranged on the LC layer 130a side of the viewing-side substrate 110a included in the color filter substrate 101a. In a reflective display region 150a, a retardation control alignment film (not shown) and a λ/4 retardation layer 111a are arranged on the colored layers in this order. A common electrode 114a is arranged over the entire surface of the viewing-side substrate 110a. In the reflective display region 150a, an aperture 116 is formed in the center portion of the common electrode 114a (an aperture provided in the common electrode 114a in the transmissive display region 160a is not shown). According to such a configuration, when a threshold voltage or higher is applied to the LC layer 130a, the IC molecules 131a in the display regions 150a and the LC molecules 131a in the transmissive display region 160a can be separately aligned in radial alignment. A vertical alignment film 112a is arranged on the entire surface of the common electrode 114a. A viewing-side polarizing plate 113a is provided on the side opposite to the LC layer 130a side of the viewing-side substrate 110a.

A TFT element (not shown) is provided on the LC layer 130a side of a glass substrate, which is a back-side substrate 120a. The TFT element is provided at each intersection of gate lines arranged parallel to each other and source lines arranged parallel to each other, the gate and source lines being arranged perpendicular to each other. An interlayer insulating film 125a having contact holes (not shown) is formed over the gate lines, the source line, and the TFT elements. A transmissive pixel electrode 124a is formed over the transmissive display region 160 and the reflective display region 150. A drain electrode of the TFT element is connected to the transmissive pixel electrode 124a through the contact hole. In the reflective display region 150a, a reflective electrode 121a is provided on the transmissive pixel electrode 124a. A vertical alignment film 122a is arranged over the entire surface of the reflective electrode 121a in the reflective display region 150a and the transmissive pixel electrode 124a in the transmissive display region 160a. A back-side polarizing plate 123a is provided on the side opposite to the LC layer 130a side of the back-side substrate 120a. A spacer 140 for adjusting the thickness of the LC layer 130a is also shown in FIG. 3.

In the LCD device 100a shown in FIG. 3, the slow axis azimuth of the λ/4 retardation layer 111a is substantially parallel to an azimuth inclined to the semi-circular shaped substrate plane (the transverse azimuth in FIG. 3). Even if the cross section of the λ/4 retardation layer 111a has a semi-circular shape, the slow axis azimuth of the λ/4 retardation layer 111a is substantially parallel to an azimuth inclined to the semi-circular shaped substrate plane (the transverse azimuth in FIG. 3), as mentioned above, and therefore the same advantages as in the configuration in accordance with Embodiment 1 shown in FIGS. 1(a) and 1(b) can be obtained.

Comparative Embodiment 1

FIG. 4 is a schematic view showing a configuration of a transflective and vertical alignment liquid crystal display device in accordance with Comparative Embodiment 1. FIG. 4(a) is a schematic plan view thereof. FIG. 4(b) is a schematic cross-sectional view thereof. FIG. 4(a) shows a positional relationship among a reflective electrode, a transmissive electrode, an aperture provided in a common electrode, and a λ/4 retardation layer. Other components are not shown. The two double-headed arrows in FIG. 4a show a slow axis azimuth of the λ/4 retardation layer and a transmission axis azimuth of a viewing-side polarizing plate. The white arrow in FIG. 4(b) shows an azimuth of an inclined portion of the λ/4 retardation layer.

The LCD device 200 in accordance with Comparative Embodiment 1 has the same configuration as in Embodiment 1, except that the slow axis azimuth of the λ/4 retardation layer 211 is perpendicular to the azimuth of the inclined portion 21b of the λ/4 retardation layer 211.

As shown in FIG. 4(b), the LCD device 200 in accordance with Comparative Embodiment 1 has a configuration in which a back-side polarizing plate 223, a TFT substrate 202, a liquid crystal layer 230, a color filter substrate 201, and a viewing-side polarizing plate 213 are arranged in this order. The LC layer 230 is constituted by LC molecules 231 and 232 each having negative dielectric anisotropy. MLC-2068 (product of Merck Ltd.) with a refractive index anisotropy of 0.08 was used as a liquid crystal material for the LC layer 230.

First, the configuration of the color filter substrate 201 is described.

As shown in FIG. 4(b), red, green, and blue colored layers (not shown) are arranged on the LC layer 230 side of a viewing-side substrate 210. In a reflective display region 250, a retardation control alignment film (not shown) and the λ/4 retardation layer 211 are arranged on the colored layer in this order. The λ/4 retardation layer 211 is composed of an inclined portion 21b in an inclination region 270 and a flat portion 21a in a flat region 280. The same photo-polymerizable LCs as that used for the λ/4 retardation layer 111 in accordance with Embodiment 1 was used for the λ/4 retardation layer 211. A common electrode 214 is arranged over the λ/4 retardation layer 211 and the viewing-side substrate 210. In the reflective display region 250, an aperture 215a is formed in the center portion of the common electrode 214. In the transmissive display region 260, an aperture 215b is formed in the center portion of the common electrode 214. As a result, when a threshold voltage or higher is applied to the LC layer 230, the LC molecules 231 in the reflective display region 250 and the LC molecules 232 in the transmissive display region 260 can be aligned in radial alignment. A vertical alignment film 212 is arranged over an entire surface of the common electrode 214. A viewing-side polarizing plate 213 is provided on the side opposite to the LC layer 230 side of the viewing-side substrate 210.

Then, the configuration of the TFT substrate 202 is described.

A TFT element (not shown) is provided on the LC layer 230 side of a back-side substrate 220. The TFT element is provided at each intersection of gate lines arranged parallel to each other and source lines arranged parallel to each other, (the gate and source lines being arranged perpendicular to each other) A drain electrode of the TFT element is connected to a transmissive pixel electrode 224 in the transmissive display region 260 and the reflective display region 250 and to a reflective electrode 221 in the reflective display region 270. A vertical alignment film 222 is arranged over the reflective electrode 221 in the reflective display region 250 and the transmissive pixel electrode 224 in the transmissive display region 260. A back-side polarizing plate 223 is provided on the side opposite to the LC layer 230 side of the back-side substrate 220.

FIG. 5 is a plan view schematically showing a relationship among the tilt azimuth of the LC molecules 232, the slow axis azimuth of the λ/4 retardation layer 211, and the transmission axis azimuth of the viewing-side polarizing plate 213 in the LCD device in accordance with Comparative Embodiment 1.

As shown in FIG. 5, the longitudinal axis azimuth of the LC molecules 232, shown in FIG. 4(b), which are aligned vertically to the inclined surface of the inclined portion 21b, is substantially perpendicular to the slow axis azimuth of the λ/4 retardation layer 211 shown by the arrow 2. The transmission axis azimuth of the viewing-side polarizing plate 213 shown by the arrow 4 makes an angle of 45° with the slow axis azimuth of the λ/4 retardation layer shown by arrow 2. Even if the tilt azimuth of the LC molecules 232 is controlled in such a way, retardation of light incident from a viewing side given by the inclined portion 21b of the λ/4 retardation layer 211 can not be compensated by the LC molecules 232. As a result, contrast ratio might be reduced.

Comparison of Reflectance Between Embodiment 1 and Comparative Embodiment 1

Reflectance in the vicinity of the reflective display region when no voltage was applied to the liquid crystal layer was simulated on the LCDs in accordance with Embodiment 1 and Comparative Embodiment 1. FIG. 6 showed the results. An LCD master (product of Shintex Corp.) was used in this simulation. The comparison was performed between a configuration in accordance with Embodiment 1 shown in FIG. 1 and a configuration in accordance with Comparative Embodiment 1 shown in FIG. 4. The λ/4 retardation layer used in the simulation had a flat portion having a thickness of 1.7 μm and an inclined portion having a thickness of 3.4 μm. The simulation was performed under the assumption that the LC molecules were aligned vertically to the inclined surface of the inclined portion in a region (inclination region) including the inclined portion of the λ/4 retardation layer, and the LC molecules were aligned vertically to the flat face of the substrate in a region (flat region) including the flat portion of the λ/4 retardation layer and in the vicinity of the back-side substrate side. The refractive index in a longitudinal axis direction of the LC molecule is 1.60, and the refractive index in a transverse axis direction of the LC molecule is 1.47.

In FIG. 6, the black circles represent results of Embodiment 1 and the white circles represent results of Comparative Embodiment 1. The horizontal axis of the graph shows a length of the width azimuth of the λ/4 retardation layer. Specifically, the reference symbol 70 shows the region (inclination region) including the inclined portion of the λ/4 retardation layer, and the reference symbol 80 shows the region (flat region) including the flat portion of the λ/4 retardation layer.

As shown in FIG. 6, when Embodiment 1 is compared to Comparative Embodiment 1, the reflectance in the inclination region in accordance with Embodiment 1 is more reduced than that in accordance with Comparative Embodiment 1, which shows that light leakage in a black display state can be suppressed.

The present application claims priority to Patent Application No. 2007-332995 filed in Japan on Dec. 25, 2007 under the Paris Convention and provisions of national law in a designated State, the entire contents of which are hereby incorporated by reference.

BRIEF DESCRIPTION OF DRAWINGS

FIG. 1(a) is a schematic plan view thereof. FIG. 1b is a schematic cross-sectional view thereof.

FIG. 4(a) is a schematic plan view thereof. FIG. 4(b) is a schematic cross-sectional view thereof.

FIG. 8(a) shows LC molecules radially aligned in a reflective display region and LC molecules aligned upward and downward in a transmissive display region. FIG. 8(b) shows LC molecules radially aligned in a reflective display region and LC molecules aligned rightward and leftward in a transmissive display region. FIG. 8(c) shows LC molecules aligned upward and downward both in a reflective display region and a transmissive display region. FIG. 8(d) shows LC molecules aligned rightward and leftward both in a reflective display region and a transmissive display region.

Figure 1:
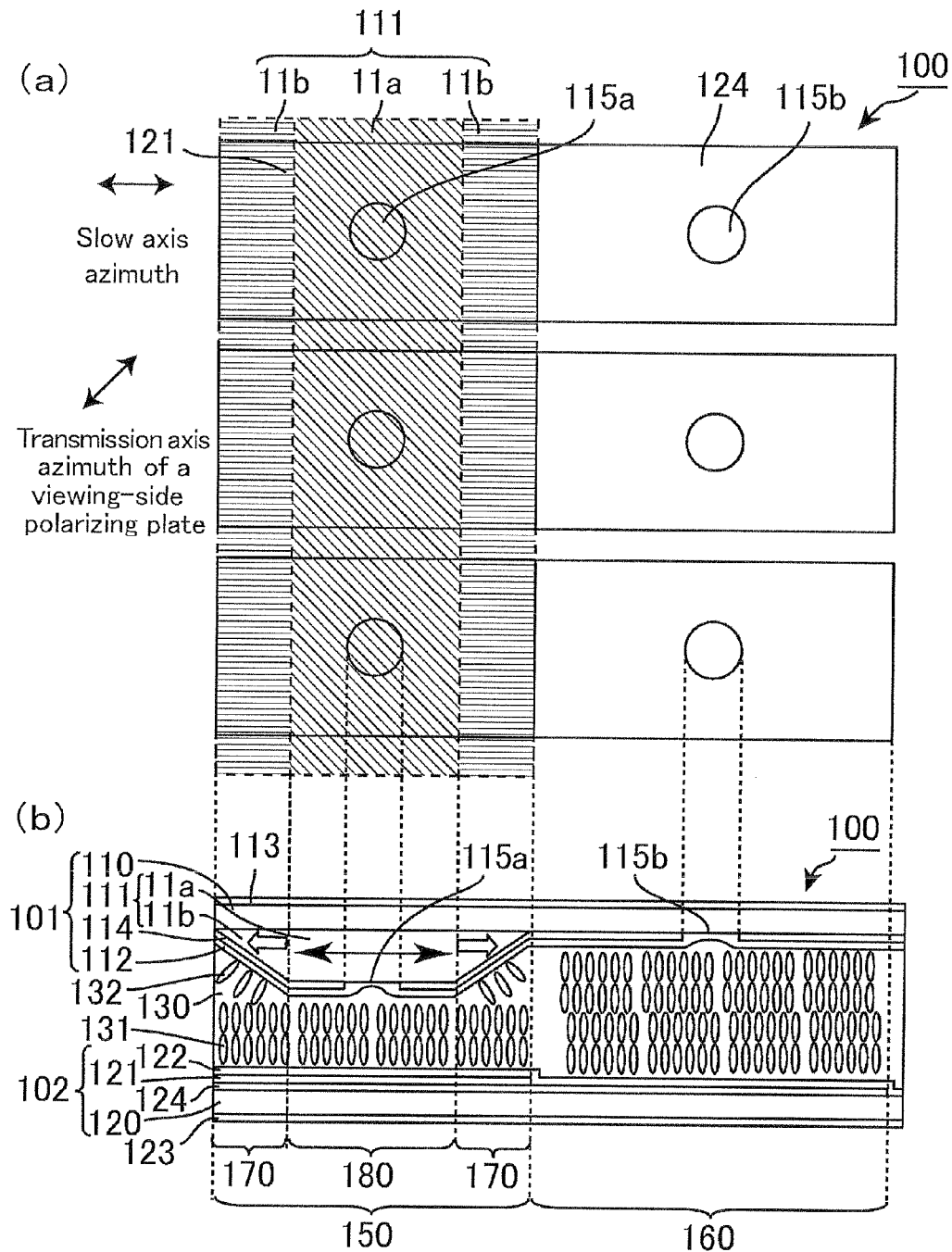
FIGS. 1(a) and 1(b) are schematic views showing a configuration of a liquid crystal display device in accordance with Embodiment 1.
Figure 2:
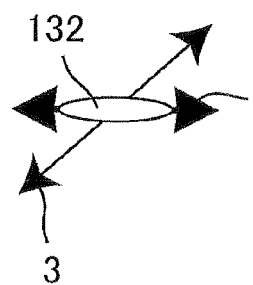
FIG. 2 is a plan view schematically showing a relationship of a tilt azimuth of LC molecules, a slow axis azimuth of a λ/4 retardation layer, and a transmission axis azimuth of a viewing-side polarizing plate in the LCD device in accordance with Embodiment 1.
Figure 3:
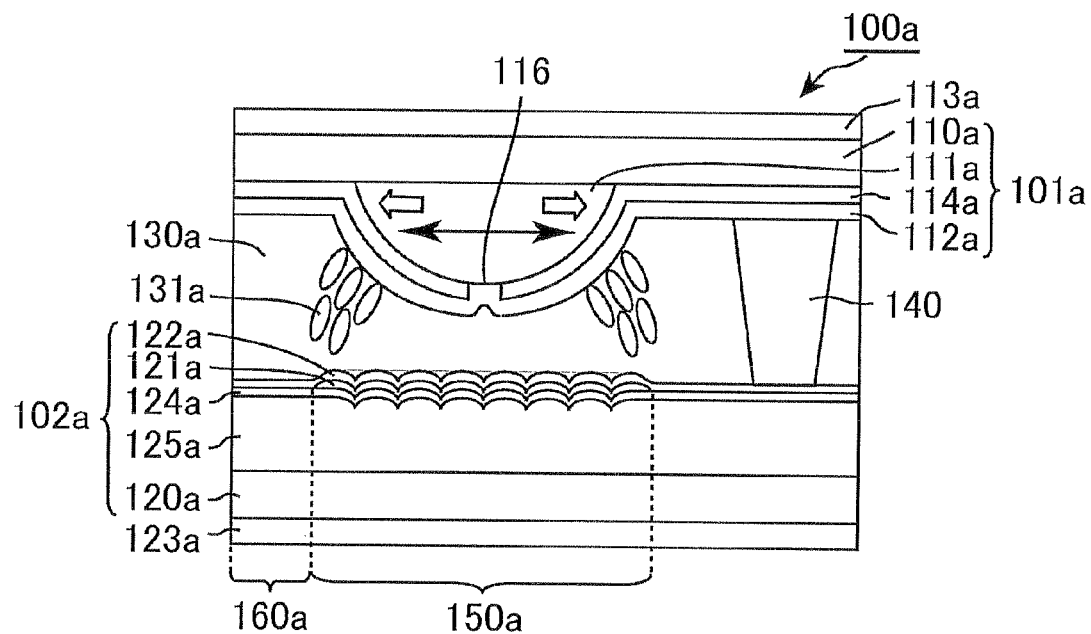
FIG. 3 is a cross-sectional view schematically showing a liquid crystal display device in accordance with a modified example of Embodiment 1.
Figure 4:
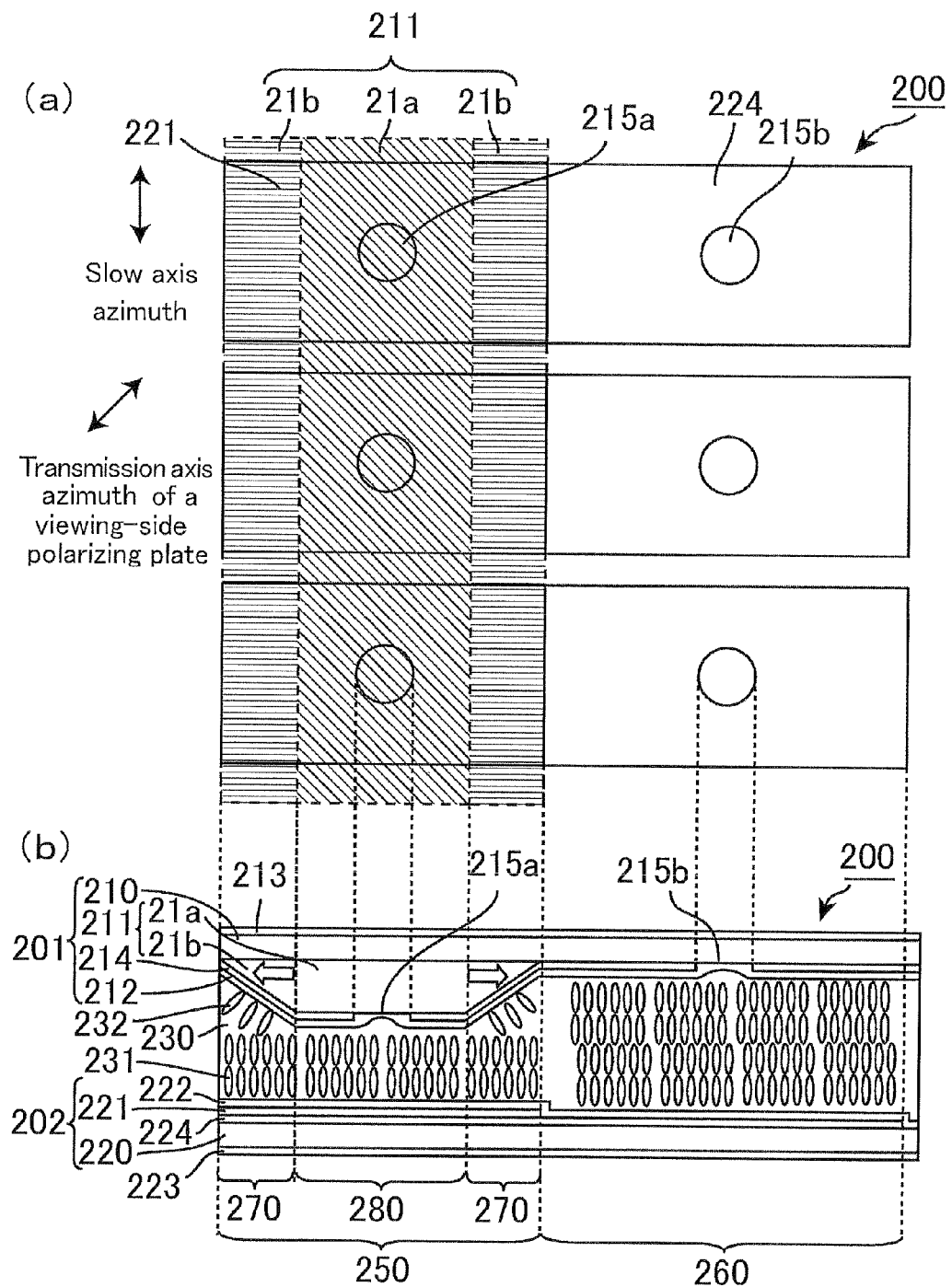
FIGS. 4(a) and 4(b) are schematic views showing a configuration of a liquid crystal display device in accordance with Comparative Embodiment 1.
Figure 5:
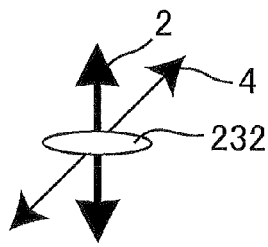
FIG. 5 is a plan view schematically showing a relationship of a tilt azimuth of LC molecules, a slow axis azimuth of a λ/4 retardation layer, and a transmission axis azimuth of a viewing-side polarizing plate in the liquid crystal display device in accordance with Comparative Embodiment 1.
Figure 6:
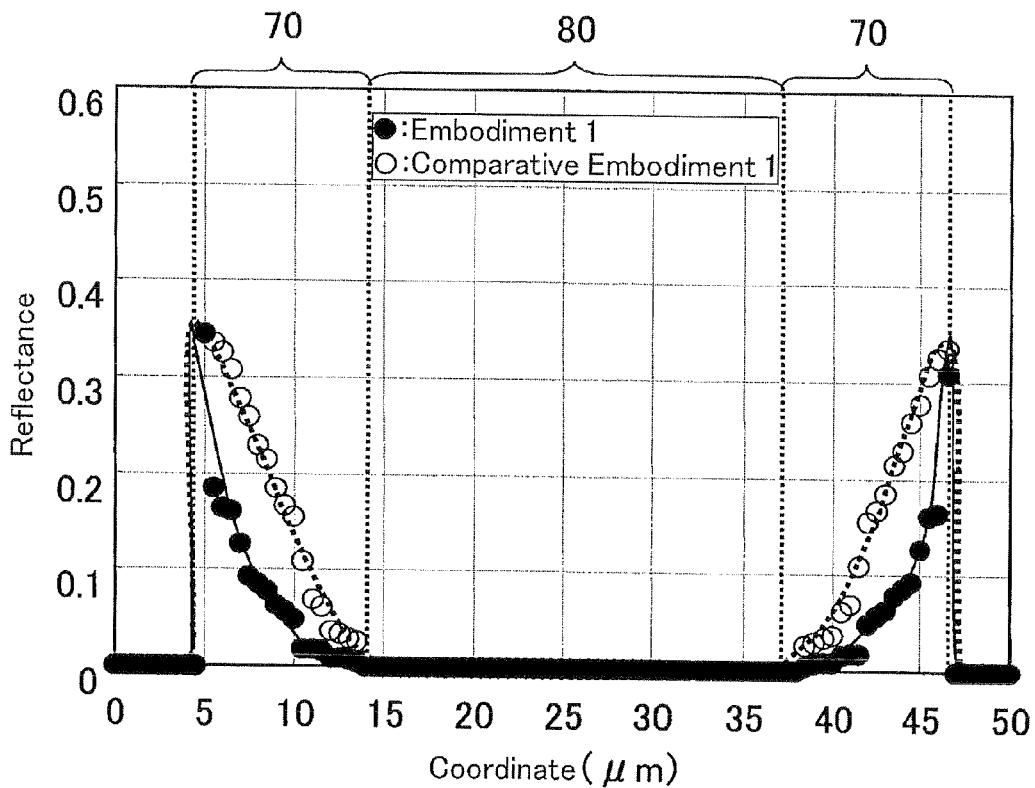
FIG. 6 is a graph showing results of simulated reflectances in the reflective display region of the liquid crystal display devices in accordance with Embodiment 1 and Comparative Embodiment 1. The black circles represent the results on the LCD device in accordance with Embodiment 1 and the white circles represent the results on the LCD device in accordance with Comparative Embodiment 1.
Figure 7:
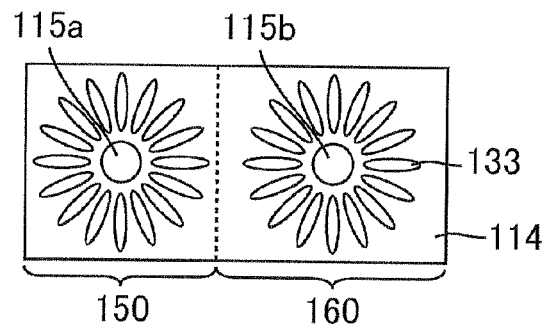
FIG. 7 is a plan view schematically showing an alignment configuration of liquid crystal molecules in a reflective display region and a transmissive display region in the LCD device in accordance with Embodiment 1.
Figure 8:
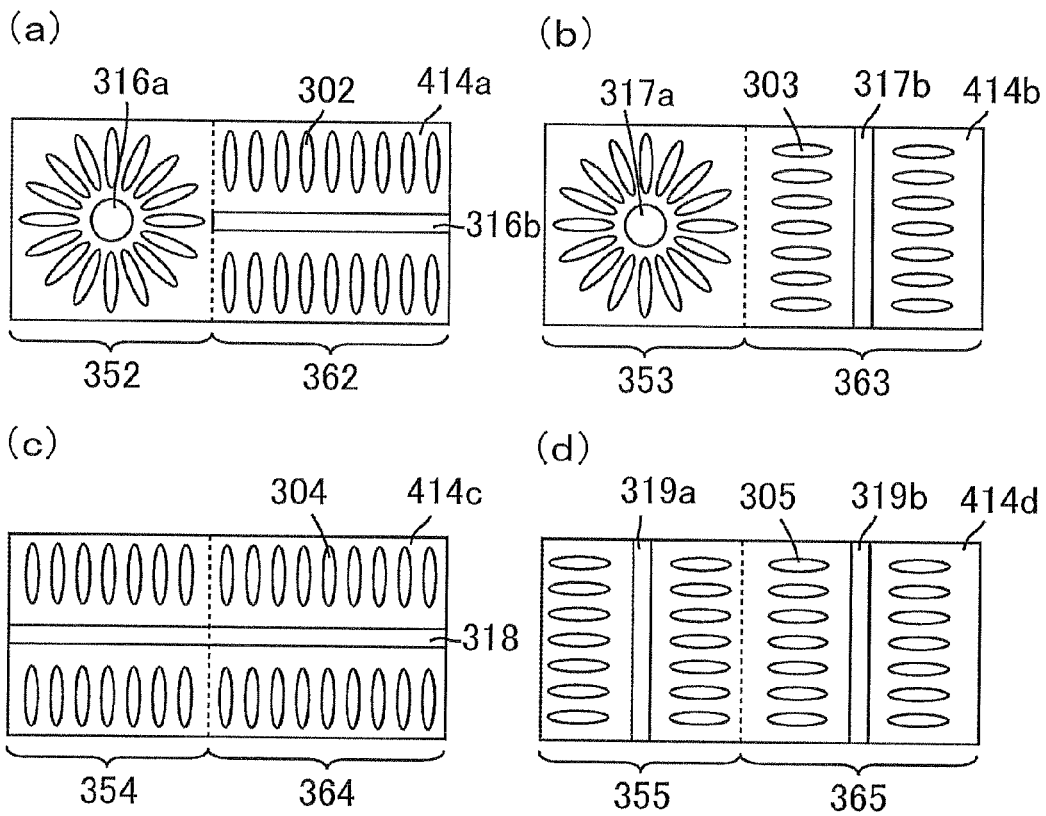
FIGS. 8(a), 8(b), 8(c), and 8(d) are plan views schematically showing an alignment configuration of liquid crystal molecules in two different domains.
Figure 9:
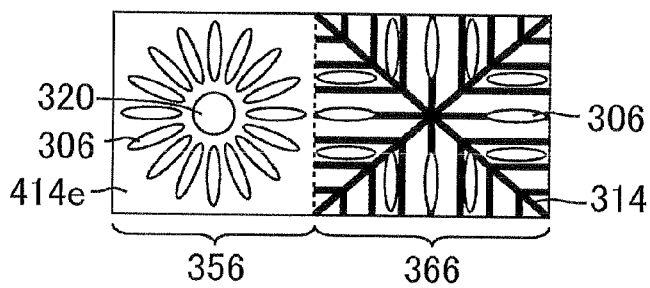
FIG. 9 is a plan view schematically showing the alignment configuration of LC molecules in four different domains in a transmissive display region.

EXPLANATION OF NUMERALS AND SYMBOLS 1, 2: Slow axis azimuth of λ/4 retardation layer
3, 4: Transmission axis azimuth of viewing-side polarizing plate
11a, 21a: Flat portion of λ/4 retardation layer
11b, 21b: Inclined portion of λ/4 retardation layer
70, 170, 270: Inclination region
80, 180, 280: Flat region
100, 100a, 200: Liquid crystal display device
101, 101a, 201: Color filter substrate
102, 102a, 202: TFT substrate
110, 110a, 210: Viewing-side substrate (glass substrate and the like)
120, 120a, 220: Back-side substrate (glass substrate and the like)
111, 111a, 211: λ/4 retardation layer
112, 112a, 122, 122a, 212, 222: Vertical alignment film
113, 113a, 213: Viewing-side polarizing plate
114, 114a, 214, 414a to 414e: Common electrode
115a, 115b, 116, 215a, 215b, 316a, 316b, 317a, 317b, 318, 319a, 319b, 320: Aperture in common electrode
121, 121a, 221: Reflective electrode
123, 123a, 223: Back-side polarizing plate
124, 124a, 224: Transmissive pixel electrode
125a: Interlayer insulating film
130, 130a, 230: Liquid crystal layer
131, 131a, 132, 133, 231, 232, 302 to 306: Liquid crystal molecule
140: Spacer
150, 150a, 250, 352 to 356: Reflective display region
160, 160a, 260, 362 to 366: Transmissive display region
314: Fine transparent electrode

The invention claimed is:

1. A vertical alignment liquid crystal display device, comprising:
 a pair of substrates composed of a viewing-side substrate and a back-side substrate facing each other;
 a liquid crystal layer disposed between the pair of substrates;
 a transmissive display region; and
 a reflective display region,
 wherein one of the pair of substrates includes a λ/4 retardation layer in the reflective display region, the λ/4 retardation layer protruding towards the liquid crystal layer,
 the λ/4 retardation layer includes an inclined portion inclined to a flat face of the substrate, and
 an azimuth of the inclined portion is substantially parallel to a slow axis azimuth of the λ/4 retardation layer.

2. The liquid crystal display device according to claim 1, wherein the λ/4 retardation layer has a thickness of about one-half a thickness of the liquid crystal layer in the transmissive display region.

3. The liquid crystal display device according to claim 1, further comprising a plurality of pixels, wherein the λ/4 retardation layer is arranged in a band shape and overlaps with the plurality of pixels, when viewed in plan.

4. The liquid crystal display device according to claim 1, wherein the λ/4 retardation layer is disposed in the viewing-side substrate.

5. A vertical alignment liquid crystal display device, comprising:
a pair of substrates facing each other;
a liquid crystal layer disposed between the pair of substrates;
a transmissive display region; and
a reflective display region,
wherein one of the pair of substrates includes a λ/4 retardation layer in the reflective display region, the λ/4 retardation layer protruding towards the liquid crystal layer,
the λ/4 retardation layer includes an inclined portion inclined to a flat face of the substrate, and
during no voltage application to the liquid crystal layer, a tilt azimuth of liquid crystal molecules in the liquid crystal layer in a region including the inclined portion is substantially parallel to a slow axis azimuth of the λ/4 retardation layer.

6. A display device substrate, comprising:
a substrate; and
a retardation layer on the substrate,
wherein the retardation layer includes an inclined portion inclined to a flat face of the substrate, and
an azimuth of the inclined portion is substantially parallel to a slow axis azimuth of the retardation layer.

7. A liquid crystal display device, comprising:
the display device substrate according to claim 6;
a counter substrate facing the display device substrate; and
a liquid crystal layer disposed between the display device substrate and the counter substrate,
wherein the retardation layer is included on a liquid crystal layer side of the display device substrate.

* * * * *